UNITED STATES PATENT OFFICE.

GEORGE L. COLLARD, OF SHARON, PENNSYLVANIA.

METHOD OF BRIQUETING FLUE-DUST.

1,047,174.  Specification of Letters Patent.  Patented Dec. 17, 1912.

No Drawing.  Application filed September 8, 1911.  Serial No. 648,268.

*To all whom it may concern:*

Be it known that I, GEORGE L. COLLARD, a citizen of the United States, residing at Sharon, in the county of Mercer and State of Pennsylvania, have invented new and useful Improvements in Methods of Briqueting Flue-Dust, of which the following is a specification.

This invention relates to a method of briqueting flue dust, or the like, whereby the same may be readily and conveniently subjected to blast furnaces or other metallurgical treatment.

In operation of blast furnaces, and particularly in the manufacture of pig iron, considerable waste occurs when certain kinds of ores are used by reason of a large percentage of the ore being carried out of the furnace in the form of a fine dust, commonly referred to as "flue dust." In order to prevent this flue dust from escaping from the furnace and to protect the premises in the vicinity of the blast furnace, various devices have been utilized to trap the dust as it is about to leave the furnace. The flue dust thus trapped is treated as a waste product as it is normally unfit to be again introduced into the furnace because of its extreme lightness and the readiness with which it will blow out of the furnace again on encountering the blast. It is well known, however, that this flue dust contains a sufficiently high percentage of metal to render it valuable and it is therefore desirable to so modify its condition that it will be rendered capable of being treated in the blast furnace in like manner as the heavier ores.

The object of the present invention is to provide means whereby the trapped flue dust may be afterward so treated that it will be held together in solid blocks or masses so that it may be fed into the blast furnaces in the same manner as the ore, to the end that the metal contained in said flue dust may be extracted in the course of the furnace operation.

In carrying out my process, I mix the flue dust with crushed or powdered limestone, and then add sufficient sulfuric acid and water to the mixture, to form a plastic mass which may be molded into any desired form and allowed to set. The plastic mass acts as a matrix to hold the flue dust, and on being molded and allowed to set retains the flue dust in solid bodies, suitable for use in the blast furnace and possessing sufficient weight to prevent its being blown out before melting.

Lime, in any form, if mixed with flue dust in sufficient quantities, and if properly treated with sulfuric acid and water, will produce the desired results, but I prefer to add crushed or powdered limestone to the flue dust rather than add lime, for the reason that the limestone is the cheaper of the two, and for the additional reason that when the acid comes in contact with the limestone, gas is set free, which produces a violent ebullition, that serves to intimately mix the plastic matter into and throughout the flue dust, better, cheaper, and more thoroughly than can be accomplished in other ways.

In practice, if the flue dust contains but little lime and not to exceed one half of one per cent. as is frequently the case, I usually mix with the flue dust about three to four per cent. of crushed or powdered limestone. Sufficient water is then added to moisten the mass and render it in the condition of mortar and suitable for molding into any desired forms. It is then treated with the sulfuric acid and stirred or mixed until the mass ceases to emit gas bubbles, or the water and the acid may be added together.

If the flue dust is rich in its lime content, a less amount of the crushed or powdered limestone may be added and fairly good results may be thus obtained, but in any event I prefer to add some of the crushed or powdered limestone in order to obtain the good results which are produced by the ebullition of the gas that is discharged when the acid comes in contact with and attacks the limestone.

Experiment has demonstrated that when briquets made according to my process are introduced into the furnace, the flue dust is maintained in a coherent mass until the temperature of the briquet is raised sufficiently high to melt the metal contained therein.

From what has been said it will be noted that I utilize the lime already present in the flue dust and thereby obtain the best results with the least admixture of foreign ingredients with the material to be treated.

In place of the limestone dolomite may be used and fairly good results may be obtained.

In practising the invention, the plastic mass may be molded by hand, or any of the ordinary forms of briqueting apparatus may be used.

While my invention is especially applicable in connection with blast furnace practice for saving the flue dust, I do not desire to limit myself thereto as it may be employed in all cases when it is desirable to briquet finely communited ore.

I claim as my invention:—

1. The process of briqueting finely comminuted ore or flue dust comprising adding limestone, sulfuric acid, and water to such ore to form a plastic mass and then forming the mass into the desired shape, while in a plastic condition.

2. The process of briqueting finely comminuted ore or flue dust comprising the mixing of crushed limestone with the ore, then adding sulfuric acid and water to the mixture, and finally molding the mass.

3. The process of briqueting finely comminuted ore or flue dust containing lime, comprising the mixing of crushed limestone with the ore and then adding approximately two percentum of sulfuric acid and twenty-five percentum of water and then forming the mass into the desired shape while in a plastic condition.

4. The process of briqueting finely comminuted ore, such as is saved in blast furnace practice in the form of flue dust, by mixing therewith crushed limestone, sulfuric acid and water and molding the mass into forms of the desired shape and allow the same to harden.

5. The process of briqueting finely comminuted ore or flue dust comprising the mixing of crushed limestone with the ore, then adding sulfuric acid to the mixture and stirring the latter until ebullition ceases, and finally molding the mass.

In testimony whereof I have hereunto set my hand in presence of two subscribing witnesses.

GEORGE L. COLLARD.

Witnesses:
 CHARLES H. McKEE,
 F. E. GAITHER.